United States Patent [19]

Nakajima et al.

[11] Patent Number: 5,292,495
[45] Date of Patent: Mar. 8, 1994

[54] POROUS PARTICLES OF CALCIUM CARBONATE AND METHOD FOR THE PREPARATION THEREOF

[75] Inventors: Takayuki Nakajima; Masao Kanoh, both of Kanagawa; Isao Sekiguchi; Yoshio Iwasaki, both of Tokyo, all of Japan

[73] Assignee: Kowa-Chemical Industry Co., Ltd., Osaka, Japan

[21] Appl. No.: 49,959

[22] Filed: Apr. 20, 1993

Related U.S. Application Data

[63] Continuation of Ser. No. 792,289, Nov. 14, 1991, abandoned.

[30] Foreign Application Priority Data

May 27, 1991 [JP] Japan ................................. 3-151155

[51] Int. Cl.⁵ .............................................. C01F 5/24
[52] U.S. Cl. ...................................... 423/432; 264/42; 423/275
[58] Field of Search .............. 423/430, 431, 432, 173, 423/176, 275; 106/409, 464; 264/42, 43

[56] References Cited

U.S. PATENT DOCUMENTS 4,714,603 12/1987 Vanderheiden .................... 423/430

FOREIGN PATENT DOCUMENTS 48-17719 5/1973 Japan ................................. 423/432
2-153819 6/1990 Japan ................................. 423/431
891557 12/1981 U.S.S.R. ............................. 423/431

*Primary Examiner*—Michael Lewis
*Assistant Examiner*—Stuart L. Hendrickson
*Attorney, Agent, or Firm*—Wyatt, Gerber, Burke and Badie

[57] ABSTRACT

A method is proposed for the preparation of porous calcium carbonate particles of which each of the particles is not an aggregate but has ink bottle-shaped pores each not communicating with the others. The method comprises: (a) blending particles of heavy calcium carbonate having a specific particle size distribution with from 0.1 to 0.3% by weight of a porosity-forming agent, e.g., sodium chloride; (b) calcining the powder blend at a temperature in the range from 800° C. to 1000° C. to decarbonate the calcium carbonate particles into particles of calcium oxide having pores developed therein; (c) slaking the particles of calcium oxide with steam to convert the calcium oxide particles into particles of calcium hydroxide; (d) drying the particles of calcium hydroxide at a temperature in the range from 100° C. to 350° C.; and (e) carbonating the dried particles of calcium hydroxide with carbon dioxide gas at a temperature in the range from 600° C. to 750°C.

5 Claims, No Drawings

POROUS PARTICLES OF CALCIUM CARBONATE AND METHOD FOR THE PREPARATION THEREOF

This application is a continuation application of co-pending application Ser. No. 07/792,289 filed Nov. 14, 1991, now abandoned.

BACKGROUND OF THE INVENTION

The present invention relates to porous particles of calcium carbonate and a method for the preparation thereof.

Powders of calcium carbonate are widely used in a wide variety of industrial fields, for example, in the industries of rubbers, plastics, paper and paints as a filler or extender, food industries and horticulture. Among various types of the calcium carbonate products under use, the so-called heavy calcium carbonate powder is produced by finely pulverizing naturally occurring calcium carbonate minerals such as limestone, calcite and the like and consumed in large quantities with a rapidly growing demand by virtue of the low production costs as a general-purpose extender in rubbers, plastics and paints.

apart from the above mentioned general-purpose calcium carbonate powders, the trend of demand for calcium carbonate products in recent years is in the direction for products of upgraded properties, in particular, in respect of the particle configuration which is not irregular as in the conventional heavy calcium carbonate powders by pulverization but spherical, columnar, cubic, spindle-shaped, scaly or flaky, whisker-shaped and so on to satisfy the special requirements in novel and unique applications of the powder. Calcium carbonate powders having a porous structure of particles are also highlighted in respect of the relatively low apparent density of the particles and used as a filler of paper, food additive, e.g., as an auxiliary mineral nutrient, carrier of certain liquid materials and the like.

Porous particles of calcium carbonate can be prepared, for example, by the method disclosed in Japanese Patent Kokai 61-168524. The porous particle obtained by this method, however, is an aggregate of finer particles or a so-called secondary particle having a dimension of several micrometers formed by aggregation of a number of primary particles having a dimension smaller than micrometer. Accordingly, such a particle is inherently not porous but the porosity thereof is formed from intercommunicating open void channels between the neighboring primary particles. This product is currently used in applications in which hiding power of the powder is required but not satisfactory in the applications as a liquid absorbent or as a base material for sustained release of certain vaporizable materials. To be satisfactorily used in these applications, it would be important that the primary particles are each inherently porous with a decreased overall specific pore surface area, increased overall pore volume and decreased average pore diameter. The pores in such porous particles each should have an ink bottle-shaped configuration not intercommunicating with the others.

SUMMARY OF THE INVENTION

The present invention accordingly has an object to provide porous particles of calcium carbonate having the above described characteristics of porosity of ink bottle-shaped discrete pores with a decreased overall specific pore surface area, increased overall pore volume and decreased average pore diameter not obtained in the prior art methods.

Thus, the porous particles of calcium carbonate of the invention are prepared by a method which comprises the steps of:

(a) blending particles of heavy calcium carbonate, of which the particle diameter is in the range from 1 μm to 20 μm and the average particle diameter is in the range from 5 μm to 15 μm, with from 0.1 to 0.3% by weight of a porosity-forming agent which is selected from the group consisting of alkali metal halides and alkaline earth metal halides into a uniform powder blend;

(b) calcining the powder blend at a temperature in the range from 800° C. to 1000° C. to decarbonate the calcium carbonate particles into particles of calcium oxide having pores developed therein;

(c) slaking the particles of calcium oxide with steam to convert the lime particles into particles of calcium hydroxide;

(d) drying the particles of calcium hydroxide at a temperature in the range from 100° C. to 350° C.; and (e) carbonating the dried particles of calcium hydroxide with carbon dioxide gas at a temperature in the range from 600° C. to 750° C.

The porous calcium carbonate particles prepared by the above described method are characterized by the parameters including: a particle diameter in the range from 1 μm to 20 μm; average particle diameter in the range from 5 μm to 15 μm; overall pore volume in the range from 1.0 to 2.0 $cm^3/g$; overall specific pore surface area in the range from 2.5 to 10.0 $m^2/g$; and average pore diameter in the range from 0.5 to 2.0 μm.

DETAILED DESCRIPTION OF THE PREFERRED EMBODIMENTS

As is described above, the starting material in the inventive method is a heavy calcium carbonate powder obtained by pulverization of a calcium carbonate mineral such as limestone. The powder should be subjected to particle size classification by a suitable known means so as to have a particle diameter in the range from 1 μm to 20 μm and an average particle diameter in the range from 5 μm to 15 μm.

The above mentioned requirements for the particle size of the starting calcium carbonate powder are very important in order that the porous calcium carbonate particles as the product may have the desirable porosity characteristics described above. When the starting calcium carbonate powder contains a substantial amount of particles having a diameter smaller than 1 μm, for example, the overall pore volume and the average pore diameter would be too small not to exhibit full performance when the powder is used as a carrier for a liquid impregnant. When the starting powder contains a substantial amount of too coarse particles, on the other hand, the average pore diameter would be too large though with an increase in the overall pore volume so that the configuration of the pores in each particle is no longer ink bottle-shaped and the powder is not satisfactory as a carrier of a sustained-release dispenser of vaporizable substances.

The starting calcium carbonate powder after the particle size classification is, in step (a), uniformly blended with a porosity-forming agent which is selected from the group consisting of alkali metal halides and alkaline earth metal halides. Chlorides and fluorides are preferred among the halides. Typical examples of suitable porosity-forming agents include chlorides and fluorides of sodium and potassium as an alkali metal element and calcium, magnesium, barium and strontium as an alkaline earth metal element. These halides can be used either singly or as a combination of two kinds or more according to need.

The amount of the porosity-forming agent, which promotes decarbonation of the calcium carbonate particles in the succeeding step (b), blended with the starting calcium carbonate powder is in the range from 0.1 to 0.3% by weight based on the calcium carbonate powder. When the amount thereof is too small, the porosity-forming effect by decarbonation would be insufficient as a matter of course. When the amount thereof is too large, on the other hand, the decarbonation-promoting effect thereby would be too strong so that the calcium oxide particles to be obtained in step (b) would be each an aggregate of extremely fine particles having a particle size of 1 $\mu$m or smaller.

The uniform powder blend obtained in step (a) is then, in step (b), calcined at a temperature in the range from about 800° to 1000° C. to effect decarbonation of calcium carbonate to form particles of calcium oxide having porosity. The decarbonation reaction should be performed as completely as possible. Full decarbonation can be achieved usually by 1 to 3 hours of calcination though dependent on the temperature.

In step (c), the thus decarbonated particles, i.e. particles of calcium oxide, are brought into contact with steam to effect slaking of calcium oxide into calcium hydroxide. This steaming treatment of the calcium oxide particles should be performed as quickly as possible following the calcination in step (b) with minimum exposure to atmospheric air. This steaming treatment of calcium oxide particles can be performed by passing steam at about 100° C. through a bed of the calcium oxide particles or by fluidizing the particles with a stream of steam. It is optional to use steam under a superatmospheric pressure to accelerate slaking. By this steaming treatment, the calcium oxide particles are converted into calcium hydroxide particles retaining the porosity as completely as possible.

The porous particles of calcium hydroxide obtained in step (c) are, prior to carbonation in step (e), subjected in step (d) to drying to remove any free moisture as completely as possible at a temperature in the range from 100° to 350° C. The drying temperature should not be too high in respect of the possible adverse influences on the reactivity in carbonation and on the porosity characteristics of the particles.

The thus dried porous particles of calcium hydroxide are then subjected in step (e) to carbonation in a dry process by using carbon dioxide gas as the carbonating agent. This carbonation treatment of the calcium hydroxide particles can be performed by passing a stream of carbon dioxide gas through a bed of the particles or by fluidizing the particles with a stream of the gas at a temperature in the range from 600° to 750° C. If necessary, the carbon dioxide gas can be diluted with air or other inert gases. Needless to say, the carbonation treatment should be as complete as possible so as not to leave any uncarbonated calcium hydroxide particles.

When each of the steps is properly performed satisfying the above described conditions, the resulting calcium carbonate particles have well developed porosity having parameters including: a particle diameter of from 1 $\mu$m to 20 $\mu$m; average particle diameter of from 5 $\mu$m to 15 $\mu$m; overall pore volume of from 1.0 to 2.0 cm$^3$/g; overall specific pore surface area of from 2.5 to 10.0 m$^2$/g; and average pore diameter of from 0.5 to 2.0 $\mu$m.

Following is a description of the procedures for the measurements of the above given parameters of the porous calcium carbonate particles or, in particular, the overall pore volume, overall specific pore surface area, and average pore diameter which can be determined by using a mercury porosimeter such as Poresizer Model 9310 manufactured by Shimadzu Seisakusho Co. A powder sample cell of 5 ml capacity and a 0.4 ml compression volume is filled with an about 0.3 g portion of the sample powder after drying in a vacuum drying oven at 120° C. for 2 hours under a pressure of $5 \times 10^{-5}$ Torr and mercury was pressurized thereinto taking 25 minutes for a pressure increase from 1.5 p.s.i. to 3000 p.s.i. The Washburn's equation $$r \cdot P = -2\gamma \cdot \cos\theta,$$

in which r is the pore diameter, P is the pressure, $\gamma$ is the surface tension of mercury and $\theta$ is the contact angle of mercury on the solid surface, was applied to the results obtained by the porosimeter measurement assuming that $\theta$ is 130° and $\gamma$ is 484 dyn/cm. The overall pore volume is the volume of mercury compressured into the pores of the porous particles up to the highest pressure applied thereto per unit weight of the powder and the overall specific pore surface area is the surface area of the pores in a unit weight of the powder assuming that the pores each have a geometrically cylindrical form having a uniform diameter. The average pore diameter can be calculated from the overall pore volume and the overall specific pore surface area assuming that the pores each have a cylindrical form of uniform diameter.

In the following, the method of the present invention is described in more detail by way of examples.

EXAMPLE 1

A uniform powder blend was prepared by thoroughly shaking a mixture of 100 g of a heavy calcium carbonate powder having a smallest particle diameter of 1 $\mu$m, largest particle diameter of 16 $\mu$m and average particle diameter of 11.5 $\mu$m and 0.2 g of a finely pulverized sodium chloride powder. The powder blend was put into a porcelain crucible and calcined at 900° C. for 3 hours in an electric muffle furnace so as to be converted into porous particles of calcium oxide. A steel tube having a perforated bottom covered with a filter paper was filled with the calcium oxide powder and steam at about 100° C. was blown from below into the steel tube for 1 hour so that the calcium oxide powder was completely slaked and converted into calcium hydroxide particles retaining the porosity.

The calcium hydroxide powder was put into a porcelain tube of an electric tubular furnace and completely dried by gradually increasing the temperature of the furnace up to 350° C. under a stream of dry air. Thereafter, the gas introduced into the tube was switched to carbon dioxide gas with simultaneous starting of temperature elevation of the furnace at a rate of about 10° C. per minute to reach 650° C. followed by a 30 minutes period for keeping the furnace at this temperature to effect carbonation of the calcium hydroxide powder. The thus obtained porous calcium carbonate particles had a particle diameter in the range from 1 to 16 $\mu$m and an average particle diameter of 11.5 $\mu$m. The porosity parameters of the product are shown in Table 1 below, which also shows the data for several commercial calcium carbonate products.

EXAMPLE 2

The experimental procedure was substantially the same as in Example 1 described above except that the amount of the sodium chloride powder blended with the heavy calcium carbonate powder was decreased to 0.1 g and the temperature of calcination of the calcium carbonate powder blended with sodium chloride was 1000° C. The porosity parameters of the product are shown in Table 1 below.

EXAMPLE 3

The experimental procedure was substantially the same as in Example 1 described above except that the sodium chloride powder was replaced with the same amount of a calcium fluoride powder. The porosity parameters of the product are shown in Table 1 below.

EXAMPLE 4

The experimental procedure was substantially the same as in Example 1 described above except that the starting heavy calcium carbonate powder had a smallest particle diameter of 1 μm, largest particle diameter of 9 μm and average particle diameter of 6.1 μm. The porosity parameters of the product are shown in Table 1 below.

EXAMPLE 5

The experimental procedure was substantially the same as in Example 4 described above except that the sodium chloride powder was replaced with the same amount of a strontium chloride powder. The porosity parameters of the product are shown in Table 1 below.

EXAMPLE 6

The experimental procedure was substantially the same as in Example 4 described above except that the amount of sodium chloride blended with the heavy calcium carbonate powder was decreased to 0.1 g and the temperature of calcination of the calcium carbonate powder blended with sodium chloride was 1000° C. The porosity parameters of the product are shown in Table 1 below.

COMPARATIVE EXAMPLE 1

The experimental procedure was substantially the same as in Example 1 described above except that the temperature of calcination of the calcium carbonate powder blended with sodium chloride was decreased to 700° C. No porous calcium carbonate particles could be obtained.

COMPARATIVE EXAMPLE 2

The experimental procedure was substantially the same as in Example 1 described above except that the amount of the sodium chloride powder blended with the heavy calcium carbonate powder was increased to 0.5 g. No porous calcium carbonate particles could be obtained.

APPLICATION EXAMPLE 1

The porous calcium carbonate particles prepared in Example 1 were impregnated with a perfume to give a sustained-release perfume dispenser, of which the sustained-release characteristic was determined by the weight decrease when the dispenser was kept in an open atmosphere. The result was that the amount of the perfume lost by evaporation after 2, 7, 14, 21 and 28 days was 27.41%, 44.68%, 54.81%, 59.84% and 64.11%, respectively.

For comparison, another sustained-release perfume dispenser was prepared in the same manner as above using a commercial product of a porous powder sold for perfume impregnation. The amount of the perfume lost by evaporation after 2, 7, 14, 21 and 28 days was 28.18%, 51.71%, 60.04%, 64.00% and 68.83%, respectively.

These results indicate that the porous calcium carbonate particles of the invention can be used satisfactorily as a carrier of a sustained-release perfume dispenser.

TABLE 1

| Sample | Overall pore Volume, ml/g | Overall specific pore surface area, $m^2/g$ | Average pore diameter, μm |
|---|---|---|---|
| Example 1 | 1.52 | 3.0 | 1.65 |
| Example 2 | 1.44 | 3.0 | 1.82 |
| Example 3 | 1.58 | 3.1 | 1.46 |
| Example 4 | 1.59 | 3.0 | 1.82 |
| Example 5 | 1.52 | 2.9 | 1.63 |
| Example 6 | 1.68 | 3.0 | 1.79 |
| *1) | 0.70 | 4.1 | 0.69 |
| *2) | 0.61 | 8.0 | 0.30 |
| *3) | 1.69 | 26.7 | 0.27 |

*1) Escalon, non-porous heacy calcium carbonate powder manufactured by Sankyo Seifun Co.
*2) Pficarb 200, non-porous light calcium carbonate powder manufactured by Pfizer Co.,
*3) Porecal A, aggregate powder of calcium carbonate manufactured by Shiraishi Calcium Co.

APPLICATION EXAMPLE 2

The porous calcium carbonate particles prepared in Example 1 were tested for the reinforcing performance for a synthetic resin. Thus, 50 parts by weight of an acrylic resin emulsion were admixed with 25 parts by weight of a heavy calcium carbonate powder as a body pigment and 25 parts by weight of the porous calcium carbonate powder prepared in Example 1 and the thus filler-loaded emulsion was shaped into a sheet having a thickness of 2 mm as dried. After seasoning for 7 days, the sheet was subjected to the measurement of the mechanical properties according to the procedure specified in JIS K 6910 to give a tensile strength of 26.3 kgf/cm$^2$ and ultimate elongation at break of 79% when the pulling velocity was 200 mm/minute.

For comparison, the same experiment as above was repeated excepting replacement of the porous calcium carbonate particles with the same amount of a commercial product of light calcium carbonate powder (Luminus, a product by Maruo Calcium Co.). Measurement of the mechanical properties of the resin sheet gave results that the tensile strength was 5.54 kgf/cm$^2$ and ultimate elongation at break was 207%.

What is claimed is:

1. A method for imparting porosity to particles of pulverized calcium carbonate mineral which comprises the steps of:
   (a) blending particles of said calcium carbonate mineral, of which the particle diameter is in the range from 1 μm to 20 μm and the average particle diameter is in the range from 5 μm to 15 μm, with from 0.1 to 0.3% by weight of particles of a porosity-forming agent selected from the group consisting of alkali metal halides, alkaline earth metal halides and mixtures thereof to give a uniform powder blend mixture consisting essentially of particles of said calcium carbonate and said agent;

(b) calcining the solid phase powder blend at a temperature in the range from 800° C. to 1000° C. to decarbonate the solid phase calcium carbonate mineral particles into solid phase particles of calcium oxide having pores developed therein;

(c) slaking the solid phase particles of calcium oxide with steam to convert the calcium oxide particles into solid phase particles of calcium hydroxide;

(d) drying the particles of calcium hydroxide at a temperature in the range from 100° C. to 350° C.; and (e) carbonating the dried solid phase particles of calcium hydroxide with carbon dioxide gas at a temperature in the range from 600° C. to 750° C.

2. The method for the preparation of porous particles of calcium carbonate as claimed in claim 1 in which the porosity-forming agent is selected from the group consisting of chlorides and fluorides of sodium, potassium, calcium, magnesium, barium and strontium.

3. The method of imparting porosity to particles of pulverized calcium carbonate mineral as claimed in claim 1 in which the carbon dioxide gas is diluted with air or an inert gas.

4. The method of imparting porosity to particles of pulverized calcium carbonate mineral as claimed in claim 1 in which the halide is sodium chloride, calcium fluoride or strontium chloride.

5. The method of imparting porosity to particles of pulverized calcium carbonate mineral as claimed in claim 1 in which the calcium carbonate mineral comprises limestone.

* * * * *